US012257466B2

(12) United States Patent
Williams et al.

(10) Patent No.: US 12,257,466 B2
(45) **Date of Patent: *Mar. 25, 2025**

(54) DRY PIPE ACCELERATOR SYSTEMS AND METHODS

(71) Applicant: Tyco Fire Products LP, Lansdale, PA (US)

(72) Inventors: James O. Williams, Marlborough, MA (US); Joshua Motha, Tiverton, RI (US)

(73) Assignee: Tyco Fire Products LP, Cranston, RI (US)

( * ) Notice: Subject to any disclaimer, the term of this patent is extended or adjusted under 35 U.S.C. 154(b) by 703 days.

This patent is subject to a terminal disclaimer.

(21) Appl. No.: 17/612,416

(22) PCT Filed: May 19, 2020

(86) PCT No.: PCT/IB2020/054743

§ 371 (c)(1),
(2) Date: Nov. 18, 2021

(87) PCT Pub. No.: WO2020/234773

PCT Pub. Date: Nov. 26, 2020

(65) Prior Publication Data

US 2022/0233900 A1 Jul. 28, 2022

Related U.S. Application Data

(60) Provisional application No. 62/970,242, filed on Feb. 5, 2020, provisional application No. 62/850,022, filed (Continued)

(51) Int. Cl.

*A62C 35/66* (2006.01)
*A62C 35/62* (2006.01)

(Continued)

(52) U.S. Cl.

CPC .............. *A62C 35/66* (2013.01); *A62C 35/62* (2013.01); *A62C 35/645* (2013.01); *A62C 35/68* (2013.01); *A62C 37/20* (2013.01)

(58) Field of Classification Search

CPC ....... A62C 35/62; A62C 35/645; A62C 35/66; A62C 35/68; A62C 37/20

See application file for complete search history.

(56) References Cited

U.S. PATENT DOCUMENTS 1,689,980 A 10/1928 Tyden
2,822,052 A * 2/1958 Herkimer ............. A62C 35/645 169/17

(Continued)

FOREIGN PATENT DOCUMENTS

CN 201064634 Y 5/2008
CN 101898018 A 12/2010

(Continued)

OTHER PUBLICATIONS

International Search Report and Written Opinion on PCT Appln. No. PCT/IB2020/054743, mail date Nov. 19, 2020, 14 pages.

*Primary Examiner* — Darren W Gorman

(74) *Attorney, Agent, or Firm* — Foley & Lardner LLP

(57) ABSTRACT

A sprinkler accelerator system includes an accelerator and at least one orifice. The accelerator is coupled with at least one pipe coupled with at least one sprinkler, and vents gas from the at least one pipe when the at least one sprinkler opens. The at least one orifice controls a rate of change of pressure in the at least one pipe to control operation of a flow control valve coupled with the accelerator.

15 Claims, 7 Drawing Sheets

Related U.S. Application Data on May 20, 2019, provisional application No. 62/850, 024, filed on May 20, 2019.

(51) Int. Cl.

| | |
|---|---|
| ***A62C 35/64*** | (2006.01) |
| ***A62C 35/68*** | (2006.01) |
| ***A62C 37/20*** | (2006.01) |

(56) References Cited

U.S. PATENT DOCUMENTS

| | | | | |
|---|---|---|---|---|
| 3,589,445 | A | 6/1971 | Juliano | |
| 3,616,860 | A | 11/1971 | Willms | |
| 3,785,440 | A | 1/1974 | Shea et al. | |
| 4,570,719 | A * | 2/1986 | Wilk | A62C 35/66 169/17 |
| 6,557,645 | B1 | 5/2003 | Ringer | |
| 6,752,217 | B2 * | 6/2004 | Reilly | A62C 35/66 169/17 |
| 8,720,591 | B2 * | 5/2014 | Burkhart | A62C 35/62 169/17 |
| 2001/0025711 | A1 | 10/2001 | Reilly | |
| 2010/0181082 | A1 | 7/2010 | Green | |
| 2011/0056709 | A1 * | 3/2011 | Feenstra | A62C 37/10 169/16 |

FOREIGN PATENT DOCUMENTS

| | | | | |
|---|---|---|---|---|
| JP | H10-155929 A | | 6/1998 | |
| KR | 200347038 Y1 | * | 4/2004 | A62C 35/68 |

* cited by examiner

DRY PIPE ACCELERATOR SYSTEMS AND METHODS

CROSS-REFERENCE TO RELATED APPLICATIONS

The present application claims the benefit of and priority to U.S. Provisional Application No. 62/850,022, titled "DRY PIPE ACCELERATOR SYSTEMS AND METHODS," filed May 20, 2019, U.S. Provisional Application No. 62/850,024, titled "DRY PIPE ACCELERATOR SYSTEMS AND METHODS," filed May 20, 2019, and U.S. Provisional Application No. 62/970,242, titled "DRY PIPE ACCELERATOR SYSTEMS AND METHODS," filed Feb. 5, 2020, the disclosures of which are incorporated herein by reference in their entireties.

BACKGROUND

Sprinkler systems can be used to respond to fires by providing fluids, such as water, to address the fire. For example, sprinkler systems can deliver fluid from a fluid supply to a sprinkler when the sprinkler opens.

SUMMARY

At least one aspect relates to a sprinkler accelerator system. The sprinkler accelerator system includes an accelerator and at least one orifice. The accelerator can include at least one accelerator opening coupled at least one pipe, the at least one pipe coupled with at least one sprinkler, a gas including at least one of air and nitrogen in the at least one pipe. The accelerator can include a vent. The accelerator can include an actuator that moves, responsive to a rate of change of a first pressure applied by gas in at least one of the first accelerator opening and the second accelerator opening satisfying a first pressure rate threshold, to couple the at least one accelerator opening with the vent. The at least one orifice can be coupled with the at least one pipe to adjust the rate of change of the first pressure responsive to the at least one sprinkler changing to an open state.

At least one aspect relates to a method of configuring a sprinkler system. The method can include coupling at least one accelerator opening of an accelerator with at least one pipe, the at least one pipe coupled with at least one sprinkler, a gas including at least one of air and nitrogen in the at least one pipe. The method can include coupling a flow control valve with a fluid supply and the at least one pipe. The method can include estimating at least one of a fluid delivery time of fluid flow from the fluid supply to the at least one sprinkler through the flow control valve after the at least one sprinkler opens and a valve trip time of operation of the flow control valve after the at least sprinkler opens. The method can include selecting at least one orifice based on the at least one of the fluid delivery time and the valve trip time. The method can include coupling the at least one orifice with the at least one pipe.

At least one aspect relates to a sprinkler accelerator system. The sprinkler accelerator system includes an accelerator, a pilot actuator, a reset actuator, and a flow control valve. The accelerator includes a first accelerator opening, a second accelerator opening, a vent, and an actuator. The first accelerator opening is coupled with a first connection point of at least one pipe, the at least one pipe coupled with at least one sprinkler. A gas including at least one of air and nitrogen is in the at least one pipe. The second accelerator opening is coupled with a second connection point of the at least one pipe. The actuator moves from a first state in which the actuator prevents gas from flowing from the first accelerator opening and the second accelerator opening out of the vent to a second state in which the first accelerator opening and the second accelerator opening are in fluid communication with the vent. The actuator moves responsive to a first pressure applied by gas in at least one of the first accelerator opening and the second accelerator opening decreasing below a first pressure threshold. The pilot actuator includes a first actuator port, a second actuator port, a drain, and a diaphragm. The first actuator port is coupled with a third connection point of the at least one pipe, the first connection point between the second connection point and the third connection point. The second actuator port is coupled with an actuator line. The diaphragm moves from a third state in which the diaphragm prevents fluid from flowing from the actuator line through the second actuator port and out of the drain to a fourth state in which the second actuator port and the drain are in fluid communication. The diaphragm moves responsive to a second pressure applied by gas in the first actuator port on the diaphragm decreasing below a second pressure threshold. The reset actuator includes a third actuator port coupled with a first fluid supply, a fourth actuator port coupled with a control line, the fourth actuator port in fluid communication with the third actuator port, a fifth actuator port coupled with the actuator line, and a seal that moves from a fifth state in which the seal prevents fluid from flowing from the third actuator port into the actuator line to a sixth state in which at least one of the third actuator port and the fourth actuator port are in fluid communication with the actuator line, the seal moves responsive to a third pressure in the fifth actuator port decreasing below a third threshold. The flow control valve includes a valve inlet coupled with a second fluid supply, a valve outlet coupled with a fourth connection point of the at least one pipe, the fourth connection point between the at least one sprinkler and the third connection point, a diaphragm supply port coupled with the control line and with a diaphragm chamber, and a diaphragm that moves in the diaphragm chamber from a seventh state in which the diaphragm prevents fluid from flowing from the valve inlet to the valve outlet to an eighth state in which the valve inlet and the valve outlet are in fluid communication. The diaphragm moves responsive to a fourth pressure in the diaphragm chamber decreasing below a fourth threshold. The first orifice is between the third connection point and the fourth connection point. The second orifice is between the first connection point and the second connection point and is smaller than the first orifice.

At least one aspect relates to a sprinkler accelerator system. The sprinkler accelerator system includes an accelerator, a pilot actuator, a reset actuator, a flow control valve, a first orifice, and a second orifice. The accelerator includes a first accelerator opening coupled with a first connection point of at least one pipe, the at least one pipe coupled with at least one sprinkler. A gas including at least one of air and nitrogen is in the at least one pipe. The accelerator includes a second accelerator opening coupled with a second connection point of the at least one pipe, a vent, and an actuator between the second accelerator opening and the vent. The pilot actuator includes a first actuator port coupled with a third connection point of the at least one pipe, the first connection point between the second connection point and the third connection point, a second actuator port coupled with an actuator line, a drain, and a diaphragm between the first actuator port and the drain. The reset actuator includes a third actuator port coupled with a first fluid supply, a fourth actuator port coupled with a control line, the fourth actuator port in fluid communication with the third actuator port, a fifth actuator port coupled with the actuator line, and a seal between third actuator port and the fifth actuator port. The flow control valve includes a valve inlet coupled with a fluid supply, a valve outlet coupled with a third connection point of the at least one pipe, the third connection point between the at least one sprinkler and the first connection point, and a valve port coupled with the vent of the accelerator. The first orifice is between the first connection point and the third connection point. The second orifice is between the first connection point and the second connection point and is smaller than the first orifice.

At least one aspect relates to a method of configuring a sprinkler system. The method includes coupling a first orifice with at least one pipe, the at least one pipe coupled with at least one sprinkler, the at least one pipe having a gas including at least one of air and nitrogen, coupling a first accelerator opening of an accelerator with a first connection point of the at least one pipe and a second accelerator opening with a second connection point of the at least one pipe, coupling a first actuator port of a pilot actuator with a third connection point of the at least one pipe and a second actuator port of the pilot actuator with an actuator line, the first connection point between the second connection point and the third connection point, coupling a third actuator port of a reset actuator with a first fluid supply, a fourth actuator port of the reset actuator with a control line, and a fifth actuator port of the reset actuator with the actuator line, coupling a valve inlet of a flow control valve with a second fluid supply, a valve outlet of the flow control valve with a fourth connection point of the at least one pipe, and a diaphragm supply port of the flow control valve with the control line, estimating at least one of a fluid delivery time of fluid flow from the second fluid supply to the at least one sprinkler after the at least one sprinkler opens and a valve trip time of operation of the flow control valve after the at least sprinkler opens, selecting a second orifice having a size that maintains the at least one of the fluid delivery time and the valve trip time below a corresponding threshold, and coupling the second orifice between the first connection point and the second connection point.

At least one aspect relates to a sprinkler accelerator system. The sprinkler accelerator system includes an accelerator and a flow control valve. The accelerator includes a first accelerator opening, a second accelerator opening, a vent, and an actuator. The first accelerator opening is coupled with a first connection point of at least one pipe, the at least one pipe coupled with at least one sprinkler. A gas including at least one of air and nitrogen is in the at least one pipe. The second accelerator opening is coupled with a second connection point of the at least one pipe. The actuator moves from a first state in which the actuator prevents gas from flowing from the first accelerator opening and the second accelerator opening out of the vent to a second state in which the first accelerator opening and the second accelerator opening are in fluid communication with the vent. The actuator moves responsive to a first pressure applied by gas in at least one of the first accelerator opening and the second accelerator opening decreasing below a first pressure threshold. The flow control valve includes a valve inlet coupled with a fluid supply, a valve outlet coupled with a third connection point of the at least one pipe, the third connection point between the at least one sprinkler and the first connection point, and a clapper that moves from a third state in which the clapper prevents fluid from flowing from the valve inlet to the valve outlet to a fourth state in which the valve inlet and the valve outlet are in fluid communication. The clapper moves responsive to a second pressure in the valve outlet decreasing below a second pressure threshold. The first orifice is between the first connection point and the third connection point. The second orifice is between the first connection point and the second connection point and is smaller than the first orifice.

At least one aspect relates to a sprinkler accelerator system. The sprinkler accelerator system includes an accelerator, a flow control valve, a first orifice, and a second orifice. The accelerator includes a first accelerator opening, a second accelerator opening, a vent, and an actuator. The first accelerator opening is coupled with a first connection point of at least one pipe, the at least one pipe coupled with at least one sprinkler. A gas including at least one of air and nitrogen is in the at least one pipe. The second accelerator opening is coupled with a second connection point of the at least one pipe. The actuator is between the second accelerator opening and the vent. The flow control valve includes a valve inlet coupled with a fluid supply, a valve outlet coupled with a third connection point of the at least one pipe, the third connection point between the at least one sprinkler and the first connection point, and a clapper between the valve inlet and the valve outlet. The first orifice is between the first connection point and the third connection point. The second orifice is between the first connection point and the second connection point and is smaller than the first orifice.

At least one aspect relates to a method of configuring a sprinkler system. The method includes coupling a first orifice with at least one pipe, the at least one pipe coupled with at least one sprinkler, a gas including at least one of air and nitrogen in the at least one pipe, coupling a first accelerator opening of an accelerator with a first connection point of the at least one pipe and a second accelerator opening with a second connection point of the at least one pipe, coupling a valve inlet of a flow control valve with a fluid supply, a valve outlet of the flow control valve with a third connection point of the at least one pipe, the third connection point between the at least one sprinkler and the first connection point, and an alarm port of the flow control valve with a vent of the accelerator, estimating at least one of a fluid delivery time of fluid flow from the second fluid supply to the at least one sprinkler after the at least one sprinkler opens and a valve trip time of operation of the flow control valve after the at least sprinkler opens, selecting a second orifice having a size that maintains the at least one of the fluid delivery time and the valve trip time below a corresponding threshold, and coupling the second orifice between the first connection point and the second connection point.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of dry pipe accelerator systems and methods. Dry pipe accelerator systems can decrease the response time of fluid delivery to sprinklers in a dry pipe sprinkler system. The various concepts introduced above and discussed in greater detail below can be implemented in any of numerous ways, including in dry systems and in wet systems.

Sprinkler systems, including dry pipe sprinkler systems, can be used to protect spaces such as unheated warehouses, parking garages, store windows, attic spaces, and loading docks, which may be exposed to freezing temperatures, such that water filled pipes might freeze if used. When set for service, the dry pipe sprinkler system can be pressurized with a gas, such as air (e.g., atmospheric air) or nitrogen. When a sprinkler of the dry pipe sprinkler system is exposed to heat from a fire, the sprinkler will open, decreasing pressure in the pipe(s) connected to the sprinkler. This decrease in pressure (e.g., pressure decay, pressure drop) can be used to trigger operation of a flow control valve that connects a fluid supply, such as a water supply, to the pipes connected to the sprinkler to deliver the fluid through the sprinkler to address the fire.

Sprinkler systems can be characterized by factors such as a valve trip time between sprinkler operation and when the flow control valve trips, and a fluid delivery time between sprinkler operation and when fluid is outputted from the sprinkler. Determining these factors, which may be necessary to properly install and operate the sprinkler system, can require a physical trip test in which fluid must be outputted from the sprinkler system. Systems and methods in accordance with the present solution can enable non-physical determination of the valve trip time and fluid delivery time by accelerating the valve trip by detecting a small pressure drop over a greater pressure range (the pressure range corresponding to a range of supervisory air or nitrogen pressure that can be used to pressurize the piping in the sprinkler system), as the greater pressure range can enable more effective optimization (e.g., reduction) of the fluid delivery time. For example, the TYCO SPRINKCAD software and/or TYCO SPRINKFDT software, which is a UL listed software for calculating fluid delivery time, can be more effectively implemented where greater pressure range is available for the sprinkler system.

Figure 1:
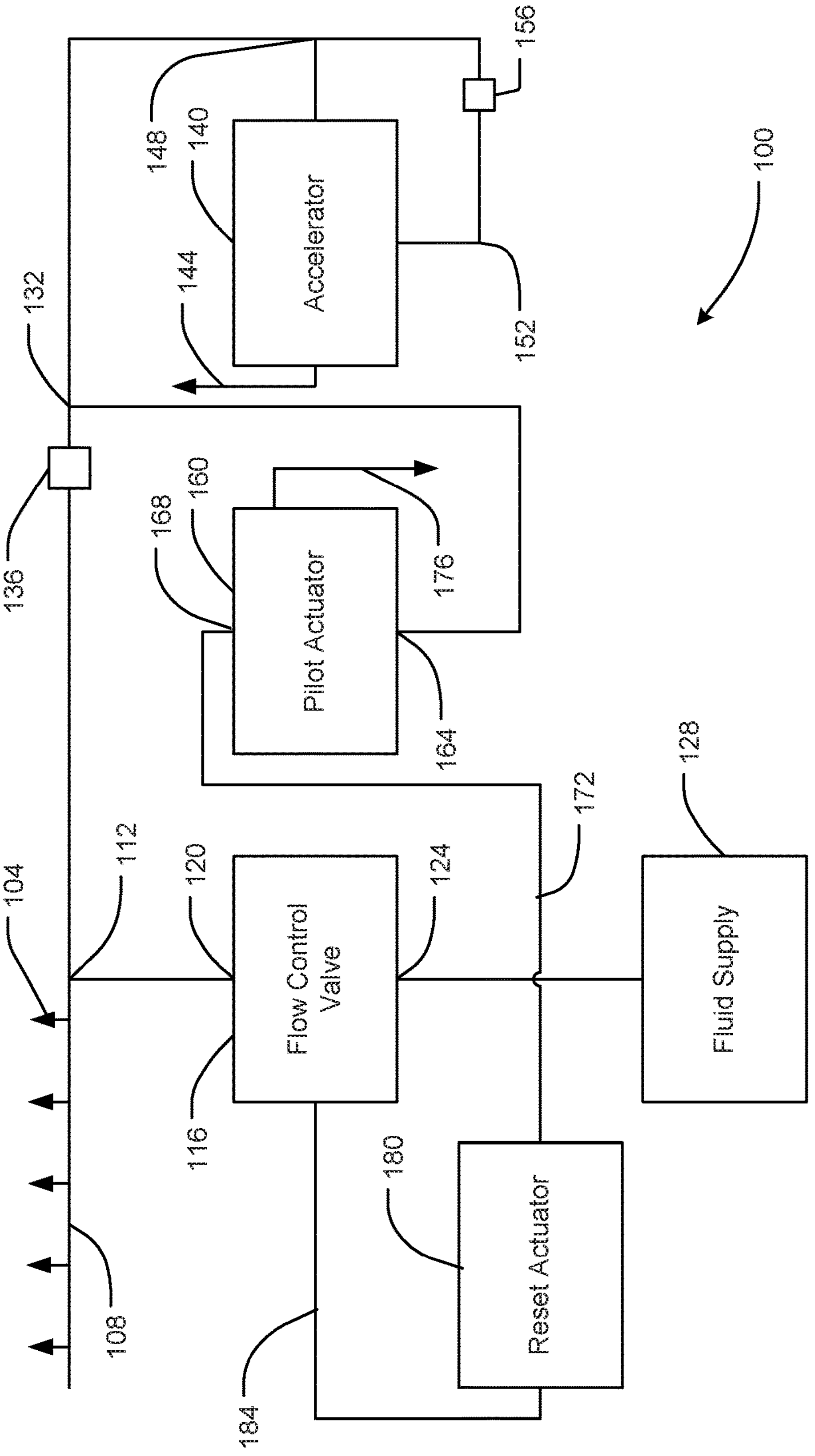
FIG. 1 is a block diagram of a dry pipe accelerator system.

FIG. 1 depicts a block diagram of a dry pipe accelerator system 100. The dry pipe accelerator system 100 includes at least one sprinkler 104 coupled with at least one pipe 108. The sprinkler 104 can operate in an open state and a closed state, and may normally operate in the closed state, such as by being biased to the closed state. The sprinkler 104 can switch to the open state in response to a fire condition, such as by being actuated to open when heated by a fire. The at least one pipe 108 can include a network of pipes, such as a manifold or piping grid. Each sprinkler 104 can receive fluid from the at least one pipe 108.

In a dry pipe sprinkler system, the at least one pipe 108 can have a gas, such as air or nitrogen in the at least one pipe 108. The gas can be at a greater pressure than atmospheric pressure. For example, the gas can have a pressure greater than or equal to 15 pounds per square inch (psi) and less than or equal to 60 psi. The pressure of the gas can be adjusted when the dry pipe accelerator system 100 is installed or configured in order to control factors such as valve trip time and fluid delivery time. When the sprinkler 104 switches to the open state, the gas in the at least one pipe 108 can flow out of the at least one pipe 108 due to the difference in pressure between the relatively high pressure in the at least one pipe 108 and the relatively low (e.g., atmospheric pressure) pressure outside of the at least one pipe 108. The decrease in pressure resulting from the gas flowing out of the at least one pipe 108 can be used to signal the fire condition. The fluid delivery time can be measured from an instant at which the sprinkler 104 switches to the open state to when fluid is outputted from the sprinkler 104.

The at least one pipe 108 can be coupled with an outlet 120 of a flow control valve 116 via at least one first connection point 112. The at least one pipe 108 can receive fluid from the outlet 120 and output the fluid via the sprinkler 104. An inlet 124 of the flow control valve 116 can be coupled with a fluid supply 128. The fluid supply 128 can have a fluid such as water or other firefighting fluids. The fluid can flow from the fluid supply 128 to the inlet 124 of the flow control valve 116. The flow control valve 116 can be a diaphragm valve, such as the DV-5A manufactured by Tyco Fire Products.

The flow control valve 116 can have an open state in which the inlet 124 is in fluid communication with the outlet 120, and a closed state in which the inlet 124 is not in fluid communication with the outlet 120. When the inlet 124 is in fluid communication with the outlet 120, the fluid can flow from the fluid supply 128 through the flow control valve 116 into the pipe 108. For example, when the sprinkler 104 has opened and the flow control valve 116 is in the open state, fluid can flow from the fluid supply 128 and out of the pipe 108, such as to address a fire responsive to which the sprinkler 104 opened. The flow control valve 116 can be biased to the closed state. For example, the flow control valve 116 can include an adjustable member, such as a diaphragm or clapper, that can prevent fluid from flowing from the inlet 124 to the outlet 120. The valve trip time can be measured from an instant at which the at least one sprinkler 104 opens to when the flow control valve 116 changes states to allow fluid to flow from the inlet 124 to the outlet 120. The valve trip time can be affected by factors such as system gas pressure and sizes of orifices 136, 156. For example, a relatively higher gas pressure in the at least one pipe 108 can result in a faster discharge of air (e.g., via orifices 136, 156), but can require a larger volume of air to be discharged for the valve to reach its trip point (e.g., flow control valve 116, other valves that may have gas on one side of the valve). A relatively lower gas pressure in the at least one pipe can result in a slower discharge of air, but can require a lesser volume of air to be discharged for the valve to reach its trip point.

The at least one pipe 108 can define a second connection point 132. The second connection point 132 can be on an opposite side of the first connection point 112 from the at least one sprinkler 104. A first orifice 136 can be between the first connection point 112 and the second connection point 132. The first orifice 136 can prevent air from backfeeding (e.g., backfeeding that would reduce a rate of pressure decay responsive to opening of the one or more sprinklers 104 in the at least one pipe 108 between the first orifice 136 and the first connection point 112 and the one or more sprinklers 104).

An accelerator 140 can be coupled with the at least one pipe 108 via the second connection point 132. The accelerator 140 can have a vent 144 (e.g., opening), which can allow gas in the at least one pipe 108 to flow out of the accelerator 140, such as to be vented to atmosphere. As such, the accelerator 140 can facilitate operation of a pilot actuator 160 as described further herein, such as to decrease a response time of the pilot actuator 160 relative to when the sprinkler 104 opens. An actuator 250 of the accelerator 140 can be coupled with the at least one pipe 108 by opening 146 (e.g., via a third connection point 148 and a fourth connection point 152, which may be formed as part of the accelerator 140 or external to the accelerator 140).

Figure 2:
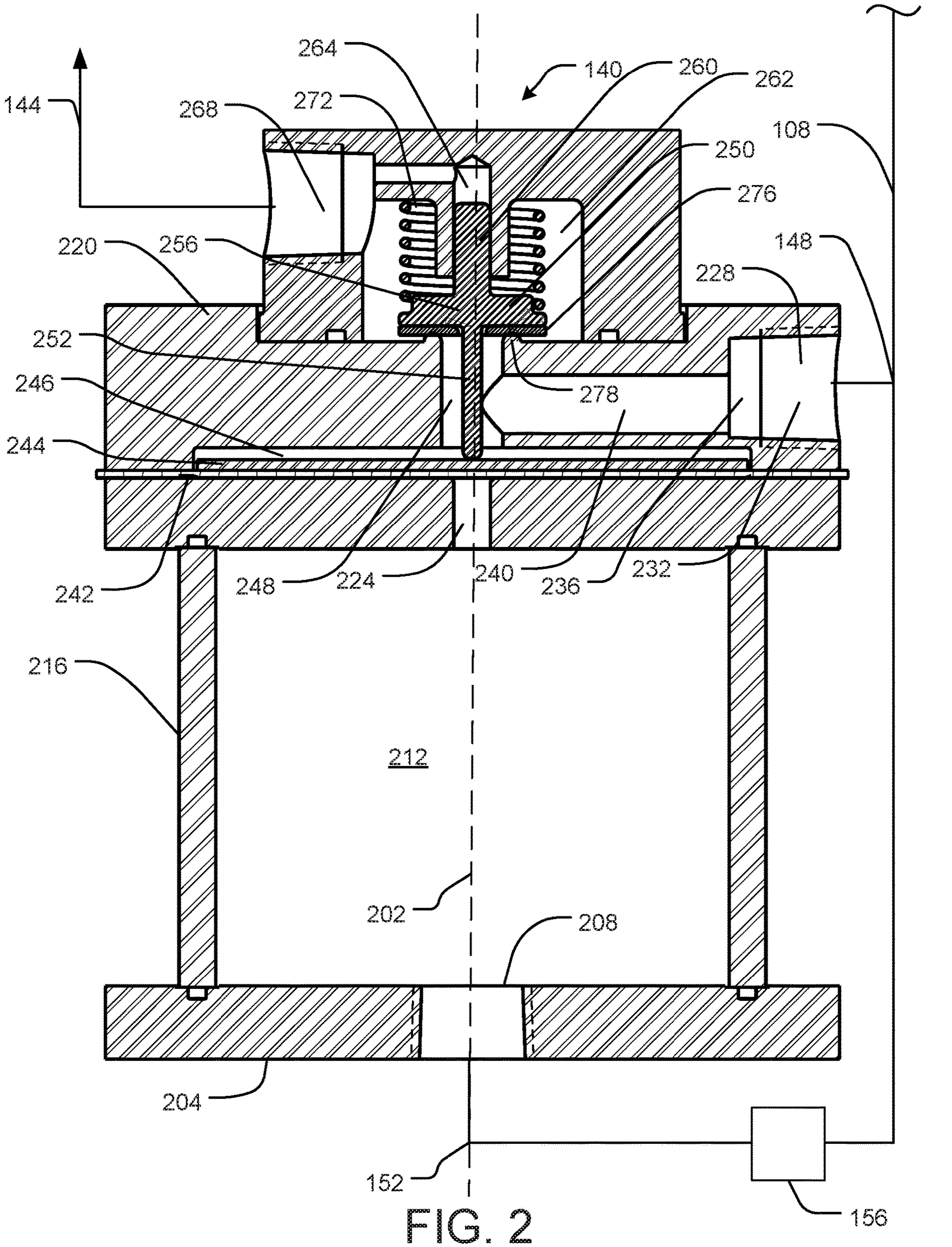
FIG. 2 is a section view of an accelerator of a dry pipe accelerator system.

FIG. 2 depicts an example of the accelerator 140. The accelerator 140 can include a base 204 defining a base opening 208 coupled with an accelerator chamber 212 defined by a base wall 216 of the base 204. The base 204 can be coupled with the at least one pipe 108 so that fluid can flow between the accelerator chamber 212 and the at least one pipe via the fourth connection point 152. As depicted in FIG. 1, the fourth connection point 152 can be formed as part of the actuator body 220 or internal to the actuator body 220, or can be external to the actuator body 220 (e.g., coupled with the base opening 208 via one or more pipes external to the actuator body 220 as depicted in FIG. 2). The base opening 208 can have a lesser diameter than the accelerator chamber 212. The accelerator chamber 212 can have a greater volume than the base opening 208 (as well as second orifice 156 as described below), which can enable the accelerator 140 to avoid activating in response to small, slow, or transient pressure changes in the at least one pipe 108, while still activating in response to pressure changes corresponding to the sprinkler 104 opening.

The base wall 216 can extend from the base 204 to an actuator body 220. The actuator body 220 can define a first actuator opening 224 coupled with the accelerator chamber 212. For example, the first actuator opening 224 can be adjacent to the accelerator chamber 212. The first actuator opening 224 can have a lesser diameter than the accelerator chamber 212, and can have a lesser diameter than the base opening 208.

The actuator body 220 can define a second actuator opening 228, which is coupled with the third connection point 148. As depicted in FIG. 1, the third connection point 148 can be formed as part of the actuator body 220 or internal to the actuator body 220, or can be external to the actuator body 220 (e.g., coupled with the second actuator opening 228 via one or more pipes external to the actuator body 220 as depicted in FIG. 2). The second actuator opening 228 can include a plurality of opening portions 232, 236, 240, which may decrease in diameter in a direction away from the third connection point 148.

The accelerator 140 includes a disk 244 adjacent to the first actuator opening 224, such that gas in the first actuator opening 224 can cause a force to be applied against the disk 244 in a direction away from the accelerator chamber 212. The disk 244 is disposed in a disk chamber 246, which has a diameter greater than or equal to a diameter of the disk 244, and greater than a diameter of the first actuator opening 224. The accelerator 140 can include a diaphragm 242 between the disk 244 and the first actuator opening 224 to facilitate the force that is applied by the gas in the first actuator opening 224 against the disk 244. The diaphragm 242 can be made of a resilient material. Gas in the second actuator opening 228 can flow between the first actuator opening 224 and the third actuator opening 248, and can apply a force on an opposite side of the disk 244 as gas in the first actuator opening 224.

The disk chamber 246 is in fluid communication with the second actuator opening 228 and a third actuator opening 248 defined by the actuator body 220. An actuator 250 can be disposed in an actuator chamber 262, and can move along an actuator axis 202 depending on pressure and changes in pressure in the at least one pipe 108. The actuator 250 can include a first actuator portion 252 that has a diameter less than the diameter of the third actuator opening 248. As depicted in FIG. 2, the first actuator portion 252 can be disposed to contact the disk 244 and extend through the third actuator opening 248. The actuator 250 can include a second actuator portion 256 between the first actuator portion 252 and a third actuator portion 260. The second actuator portion 256 can have a greater diameter than the first actuator portion 252 and the third actuator opening 248, such that the second actuator portion 256 may not move into the third actuator opening 248. The third actuator portion 260 can extend within a fourth actuator opening 264.

A seal 276 can be disposed between the second actuator portion 256 and the second actuator opening 228. The seal 276 can prevent gas from flowing between the second actuator opening 228 and third actuator opening 248, on one side of the seal 276, and the actuator chamber 262 on the other side of the seal from the third actuator opening 248.

As depicted in FIG. 2, the accelerator 140 and actuator 250 can be sized such that when the first actuator portion 252 contacts the disk 244, the second actuator portion 256 contacts the seal 276, and the third actuator portion 260 is spaced from an end of the fourth actuator opening 264.

A biasing member 272 can be disposed in the actuator chamber 262 to apply a biasing force against the actuator 250 towards the accelerator chamber 212. The biasing member 272 can be a spring. As such, gas in the first actuator opening 224 can apply a force against the actuator 250 (e.g., via disk 244) to push the actuator 250 away from the accelerator chamber 212, while gas in the second actuator opening 228, gas in the fourth actuator opening 264, and the biasing member 272 can apply a force against the actuator 250 (e.g., via the disk 244) towards the accelerator chamber 212. The balance of these forces can change as the pressure in the at least one pipe 108 changes, which can result in a greater force pushing the actuator 250 away from the accelerator chamber 212 than towards the accelerator chamber 212. As a result, the disk 244 can move in the disk chamber 246 away from the accelerator chamber 212, pushing the actuator 250 and the seal 276 away from the accelerator chamber 212 and seal receiver 278, allowing gas in the third actuator opening 248 to move the seal 276 away from the accelerator chamber 212, fluidly coupling the third actuator opening 248 with the fifth actuator opening 268. As such, gas in the at least one pipe 108 can flow through the accelerator 140 and out the vent 144.

As depicted in FIGS. 1 and 2, a second orifice 156 can be provided between the actuator 250 and the third connection point 148 (as well as the second connection point 132), such that the second orifice 156 is upstream of the first orifice 136 as gas flows out of the at least one pipe 108 through the sprinkler 104 when the sprinkler 104 is open. The second orifice 156 can be provided as part of the accelerator 140.

The second orifice 156 can be between the at least one pipe 108 and the base opening 208. The second orifice 156 can enable the accelerator 140 to be automatically reset, rather than being dried and manually reset. The second orifice 156 can be smaller than the first orifice 136. For example, the second orifice 156 can have a lesser internal diameter than the first orifice 136. The second orifice 156 can have a lesser K-factor than the first orifice 136, where the K-factor is defined as $Q^*P^{1/2}$, where Q is flow rate and P is pressure drop.

Because the second orifice 156 can be between the third connection point 148 coupled with the second actuator opening 228 and the fourth connection point 152 coupled with the accelerator chamber 212 via the base opening 208, when the sprinkler 104 opens, a rate of pressure change (e.g., rate of pressure decay) in the second actuator opening 228 can be greater than a rate of pressure change (e.g., rate of pressure decay) in the first actuator opening 224, such that the pressure in the first actuator opening 224 will be greater than the pressure in the second actuator opening 228, changing the balance of forces on the actuator 250 (e.g., via the force balance on the disk 244) such that the actuator 250 can be driven away from the accelerator chamber 212.

Figure 3:
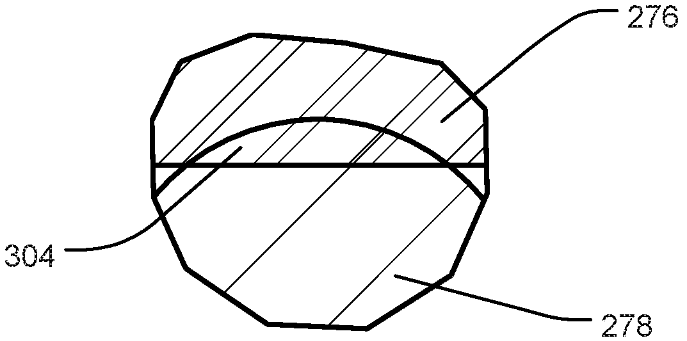
FIG. 3 is a detail view of a seal of an accelerator of a dry pipe accelerator system.

FIG. 3 depicts an example of contact between the seal 276 and a seal receiver 278 of the actuator body 220. The seal receiver 278 can include one or more extensions 304, such as radiused bumps. The extensions can compress the seal 276 between the seal receiver 278 and the second actuator portion 256 to improve the sealing provided by the seal 276.

As depicted in FIG. 1, a pilot actuator 160 includes a first actuator port 164 fluidly coupled with the at least one pipe 108 via the second connection point 132. Gas in the at least one pipe 108 can flow between the at least one pipe 108 and the first actuator port 164 via the second connection point 132. When gas in the at least one pipe 108 vents from the accelerator 140 via the vent 144, the pressure in the pilot actuator 160 can decrease as gas in the at least one pipe 108 between the first actuator port 164 and the second connection point 132 can flow through the at least one pipe 108 and out of the accelerator 140. The pilot actuator 160 can be a dry pilot actuator for deluge and preaction systems.

The pilot actuator 160 includes a second actuator port 168 coupled with a reset actuator 180. Water can flow in an actuator line 172 (e.g., pipe) between the second actuator port 168 and the reset actuator 180 into the pilot actuator 160. The pilot actuator 160 can maintain a force balance between the air on the first actuator port 164 side of the pilot actuator 160 and the water on the second actuator port 168 side of the pilot actuator 160 (e.g., using a clapper). When the pressure in the at least one pipe 108 decreases due to venting via the accelerator 140, the force balance in the pilot actuator 160 can change, allowing water in the pilot actuator 160, and thus in the actuator line 172, to flow out of a drain 176.

Figure 4:
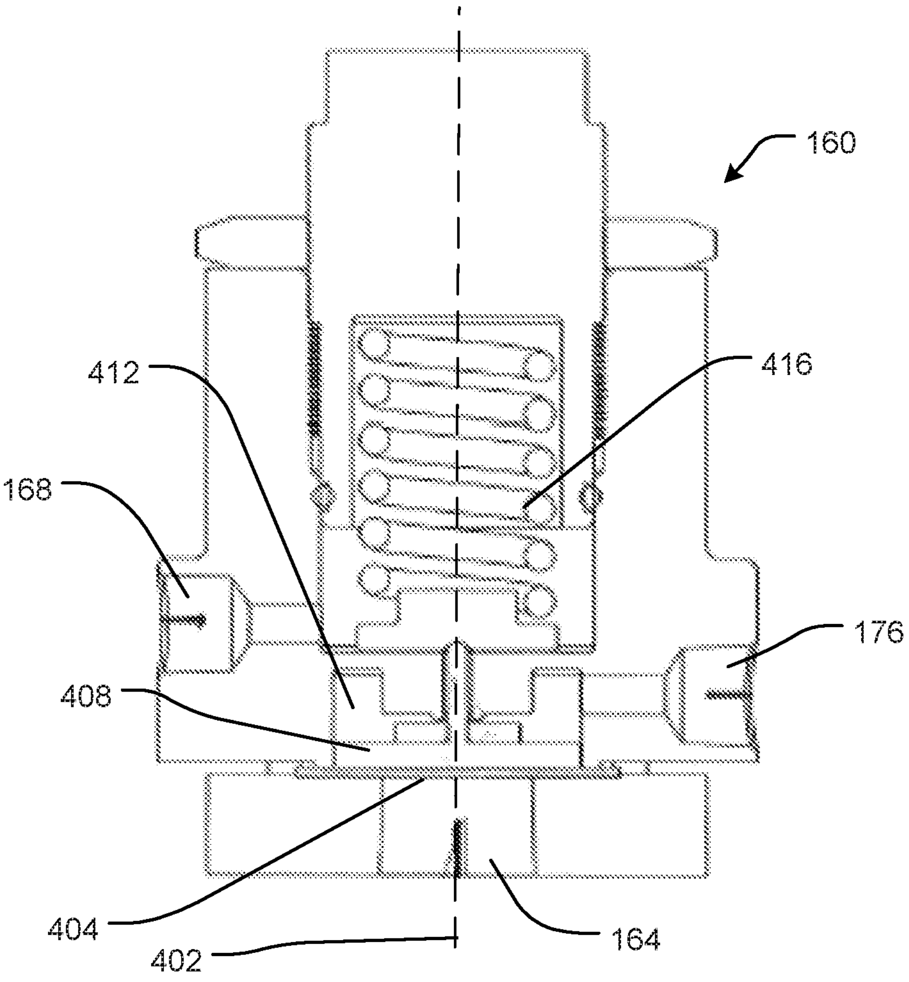
FIG. 4 is a section view of a pilot actuator of a dry pipe accelerator system.

FIG. 4 depicts an example of the pilot actuator 160. The pilot actuator 160 includes a pilot diaphragm 404 adjacent to the first actuator port 164. The pilot diaphragm 404 can be made of a resilient material. Gas in the first actuator port 164 can cause a force to be applied on the pilot diaphragm 404 in a direction away from the first actuator port 164 along pilot actuator axis 402. The pilot actuator 160 includes a pilot seal 408 between the pilot diaphragm 404 and the second actuator port 168. The pilot seal 408 seals fluid flow from the second actuator port 168 into a pilot chamber 412, so that in a sealed state, the pilot actuator 160 prevents fluid from flowing from the second actuator port 168 through the pilot chamber 412 and out of the drain 176.

The pilot actuator 160 includes a pilot biasing member 416, such as a spring. The pilot biasing member 416 and fluid in the second actuator port 168 can apply a force on the pilot seal 408, and in turn the pilot diaphragm 404, along the pilot actuator axis 402 in a direction towards the first actuator port 164. As such, when a force corresponding to the pressure of the gas in the first actuator port 164 is greater than a force corresponding to the pressure of the fluid in the second actuator port 168 and the force applied by the pilot biasing member 416 on the pilot seal 408, the pilot diaphragm 404 can hold the pilot seal 408 against the second actuator port 168 to prevent fluid flow from the second actuator port 168 into the pilot chamber 412 and out of the drain 176. When the pressure of the gas in the first actuator port 164 decreases below a pressure threshold corresponding to the force applied by the fluid in the second actuator port 168 and the pilot biasing member 416 (e.g., due to the accelerator 140 venting gas in the at least one pipe 108), the pilot diaphragm 404 and pilot seal 408 can move away from the second actuator port 168 and towards the first actuator port 164, allowing fluid to drain from the second actuator port 168 (and the actuator line 172) out of the drain 176.

As depicted in FIG. 1, the reset actuator 180 is coupled with the pilot actuator 160 via actuator line 172, and with the flow control valve 116 via control line 184 (e.g., pipe). Fluid can flow between the reset actuator 180 and the flow control valve 116 via the control line 184. For example, when the reset actuator 180 is triggered by fluid draining out of the pilot actuator 160 via the drain 176, fluid can flow from the reset actuator 180 through the actuator line 172 and out of the drain 176.

Figure 5:
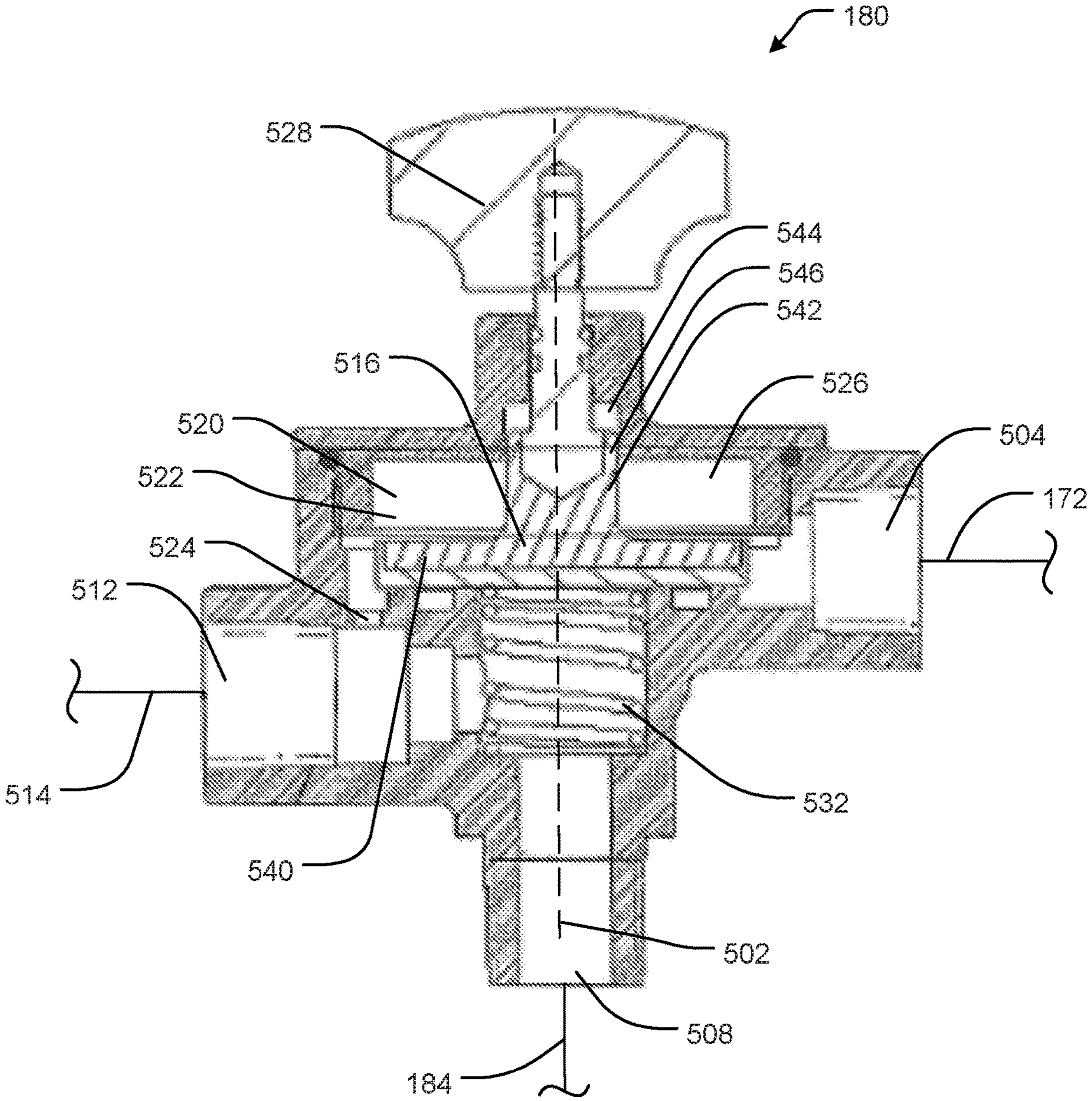
FIG. 5 is a section view of a manual reset actuator of a dry pipe accelerator system.

FIG. 5 depicts an example of the reset actuator 180. The reset actuator 180 can be a manual reset actuator. The reset actuator 180 can include a first reset actuator port 504 coupled with the actuator line 172, allowing fluid to flow between the reset actuator 180 and the pilot actuator 160. The reset actuator 180 can include a second reset actuator port 508 coupled with the flow control valve 116, allowing fluid to flow between the reset actuator 180 and the flow control valve 116. The reset actuator 180 can include a third reset actuator port 512, which can be coupled with a fluid supply via a supply line 514 (e.g., pipe). As depicted in FIG. 5, the second reset actuator port 508 and third reset actuator port 512 can be in fluid communication, allowing fluid to flow from the supply line 514 through the control line 184 (e.g., to the flow control valve 116). In some embodiments, when the reset actuator 180 is in a first state (e.g., a closed state when the reset device 528 is closer to the first chamber portion 522 or biasing member 532 than in a second, open state), fluid may flow from the supply line 514 through the third reset actuator port 512 into the second reset actuator port 508.

The reset actuator 180 includes a seal 516, such as a plunger. In the first state of the reset actuator 180, the seal 516 can prevent fluid flow from the third reset actuator port 512 to the first reset actuator port 504 (though at least some fluid may flow from the third reset actuator port 512 to the first reset actuator port 504 via orifice 524). The seal 516 can be disposed in a seal chamber 520 that includes a first chamber portion 522 in communication with the third reset actuator port 512 via an orifice 524, and a second chamber portion 526 in communication with the first reset actuator port 504. The orifice 524 can have a lesser diameter than the third reset actuator port 512 and the seal chamber 520.

The seal 516 can include a first seal portion 540 having a greater diameter than a second seal portion 542. The first seal portion 540 can be closer to the second reset actuator port 508 than the second seal portion 542, and can be adjacent to, such as in contact with, a biasing member 532. The second seal portion 542 can be disposed in a seal receiver 544 adjacent to the seal chamber 520.

The biasing member 532 can be a spring. The biasing member 532 can cooperate with fluid in the second reset actuator port 508 to apply a force against the seal 516 in a direction away from the second reset actuator port 508. For example, the biasing member 532 can cooperate with the fluid in the second reset actuator port 508 to bias the seal 516 to a position in which fluid is allowed to flow from the second reset actuator port 508 or the third reset actuator port 512 out of the first reset actuator port 504.

As discussed above, the first reset actuator port 504 is coupled with the pilot actuator 160 via the actuator line 172. When fluid from the actuator line 172 flows out of the drain 176 of the pilot actuator 160, the fluid pressure in the first reset actuator port 504 will decrease. When the fluid pressure in the first reset actuator port 504 decreases below a threshold corresponding to at least the force applied by the biasing member 532 and fluid in the second reset actuator port 508 on the seal 516, the seal 516 can move away from the second reset actuator port 508 along an actuator axis 502, allowing fluid in the seal chamber 520 to flow out of the first reset actuator port 504 through the actuator line 172. As fluid in the seal chamber 520 flows out of the first reset actuator port 504, pressure in the second reset actuator port 508 and the control line 184 can decrease, such as due to at least one of fluid flowing from the control line 184 through the pilot actuator 160 and out of the actuator line 172 and fluid from the supply line 514 being at least partially diverted to the actuator line 172 rather than the control line 184.

The reset actuator 180 can include a reset device 528 (e.g., trigger, knob, button) coupled with the seal 516. The reset device 528 can extend into the seal receiver 544. The reset device 528 can be secured by a receiving end 546 of the second seal portion 542. The reset device 528 can be pushed towards the second reset actuator port 508 to compress the biasing member 532 and move the seal 516 into position to seal the first chamber portion 522 (e.g., seal chamber 520, first chamber portion 522, second chamber portion 526) from the second reset actuator port 508.

As depicted in FIG. 1, the flow control valve 116 controls fluid flow from the fluid supply 128 to the at least one sprinkler 104. The flow control valve 116 can selectively allow fluid to flow to the at least one sprinkler 104 based on fluid pressure in the control line 184. For example, the flow control valve 116 can use fluid in the control line 184 to hold a control member, such as a diaphragm or clapper, in a first state in which the control member prevents fluid from flowing from the inlet 124 to the outlet 120. When fluid pressure in the control line 184 decreases, the control member can adjust to a second state in which the inlet 124 is in fluid communication with the outlet 120, enabling fluid to flow from the fluid supply 128 to the at least one sprinkler 104. For example, when the at least one sprinkler 104 opens due to a fire condition, pressure in the at least one pipe 108 can decrease, which can trigger operation of the accelerator 140 to vent gas in the at least one pipe 108 from the accelerator 140, which can trigger operation of the pilot actuator 160 to drain fluid from the actuator line 172 through the pilot actuator 160, which can trigger operation of the reset actuator 180 to decrease the fluid pressure in the control line 184, which can cause the flow control valve 116 to couple the inlet 124 with the outlet 120 to allow fluid to flow out of the at least one sprinkler 104 and address the fire condition.

The second orifice 156 can have a size (e.g., diameter) selected to improve or optimize the characteristics of the flow control valve 116 to a fire condition that opens the at least one sprinkler 104. As such, the configurability of the dry pipe accelerator system 100 to various sizes and other characteristics of the at least one pipe 108 can be increased. For example, varying the size of the second orifice 156 can allow for a greater range of system pressures to be used for the gas in the at least one pipe 108, while still achieving target characteristics such as valve trip time and fluid delivery time (e.g., to maintain the fluid delivery time below a target threshold time). The second orifice 156 can be replaceable. For example, various second orifices 156 having various sizes can be manufactured, and selected when configuring the dry pipe accelerator system 100 based on desired operational characteristics. The valve trip time can be affected by factors such as system gas pressure and sizes of orifices 136, 156. For example, a relatively higher gas pressure in the at least one pipe 108 can result in a faster discharge of air (e.g., via orifices 136, 156), but can require a larger volume of air to be discharged for the valve to reach its trip point (e.g., flow control valve 116, other valves that may have gas on one side of the valve). A relatively lower gas pressure in the at least one pipe can result in a slower discharge of air, but can require a lesser volume of air to be discharged for the valve to reach its trip point. Varying the size of the second orifice 156 can able a greater range of system pressure to be used to configure the dry pipe accelerator system 100 and take advantage of the effects of system on characteristics such as valve trip time.

Figure 6:
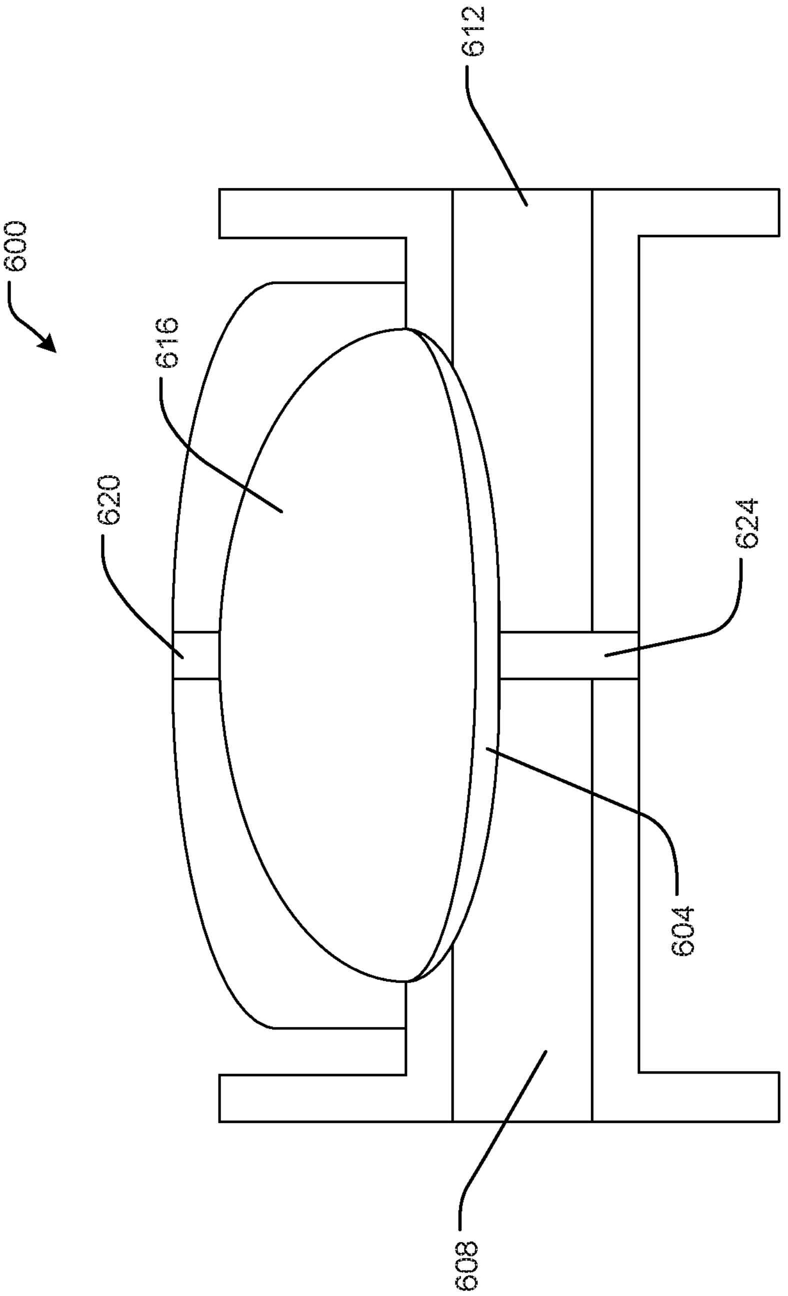
FIG. 6 is a section view of a diaphragm flow control valve of a dry pipe accelerator system.

FIG. 6 depicts an example of a flow control valve 600 that includes a diaphragm 604. The flow control valve 600 can be used to implement the flow control valve 116 described with reference to FIG. 1. The diaphragm 604 can be made of a resilient material. The flow control valve 116 can include a fluid inlet 608 separated from a fluid outlet 612 by the diaphragm 604 when the diaphragm 604 is in a first position as depicted in FIG. 6. The fluid inlet 608 can be coupled with the fluid supply 128 depicted in FIG. 1, and the fluid outlet can be coupled with the at least one pipe 108 depicted in FIG. 1.

The diaphragm 604 can be disposed in a diaphragm chamber 616 in communication with a chamber supply port 620. The chamber supply port 620 can be coupled with the reset actuator 180 via the control line 184, so that fluid in the control line 184 can flow through the chamber supply port 620 into the diaphragm chamber 616 to apply pressure on the diaphragm 604. The pressure applied on the diaphragm 604 by fluid in the diaphragm chamber 616 can maintain the diaphragm 604 in the first position to prevent fluid flow from the fluid inlet 608 to the fluid outlet 612.

As discussed above with respect to FIG. 1, pressure in the control line 184 can decrease when the reset actuator 180 is triggered to output fluid through the actuator line 172 and out of the drain 176. When pressure in the control line 184 decreases, pressure in the diaphragm chamber 616 can decrease. When pressure in the diaphragm chamber 616 decreases to be less than a threshold corresponding to operation of the diaphragm 604 (e.g., based on factors such as flexibility of the diaphragm 604, a bias of the diaphragm 604, and fluid pressure applied by fluid in the fluid inlet 608 on the diaphragm 604), the diaphragm 604 can move away from the first position and away from the fluid inlet 608 and the fluid outlet 612, allowing fluid in the fluid inlet 608 to flow through a space occupied by the diaphragm 604 when the diaphragm 604 was in the first position to the fluid outlet 612.

The flow control valve 600 can include a port 624. The port 624 can be coupled with at least one of atmosphere or an alarm. For example, when the diaphragm 604 moves away from the first position, fluid can flow through the port 624 to an alarm to cause the alarm to output an indication of a fire condition.

Figure 7:
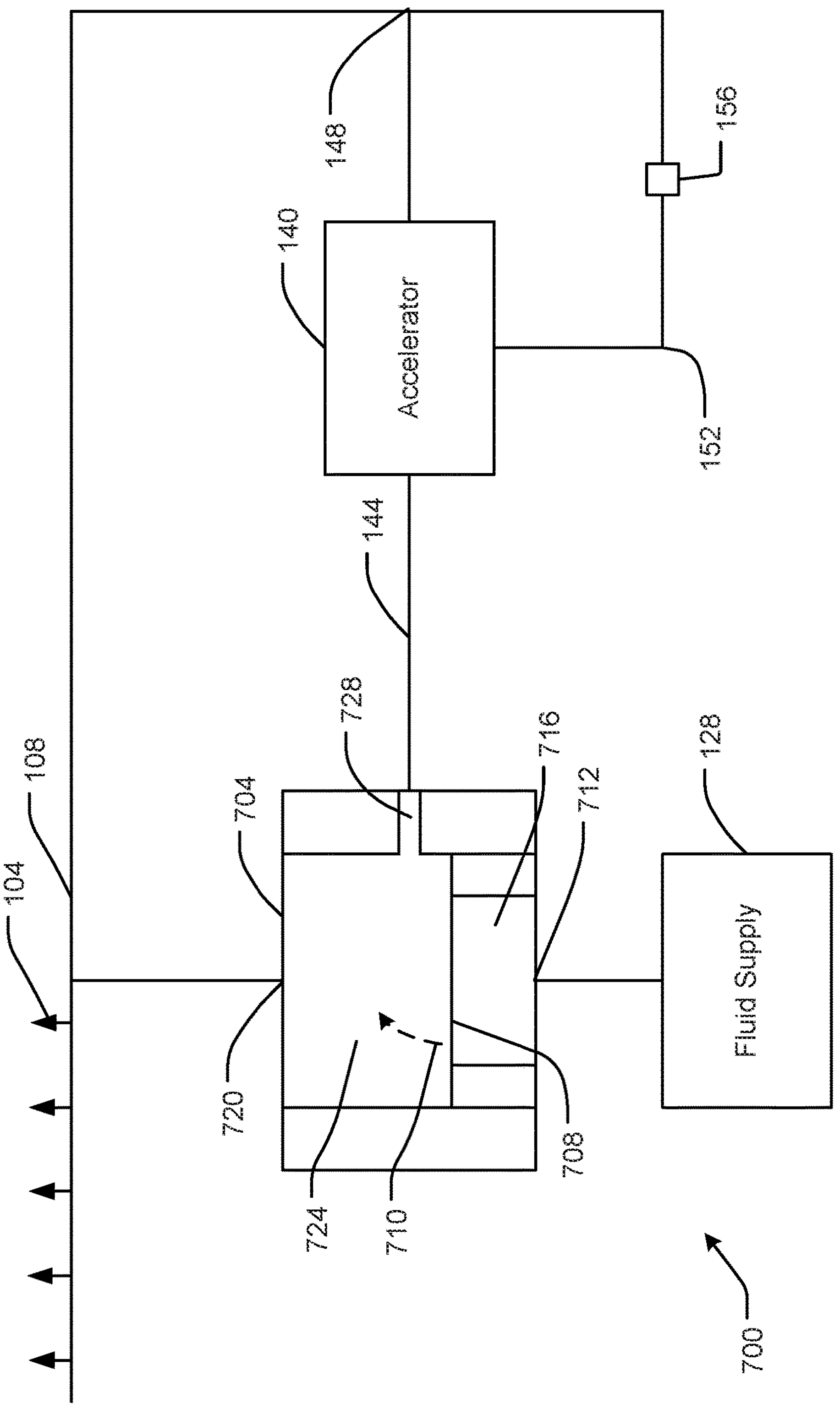
FIG. 7 is a block diagram of a dry pipe accelerator system.

FIG. 7 depicts a dry pipe accelerator system 700 that uses a flow control valve 704 including a clapper 708. The flow control valve 704 can be the DPV-1 manufactured by Tyco Fire Products. The flow control valve 704 can include a fluid inlet port 712 coupled with a fluid chamber 716. The fluid inlet port 712 can receive fluid from the fluid supply 128. The flow control valve 704 can include a fluid outlet port 720 coupled with a gas chamber 724. The fluid inlet port 712 can be coupled with the at least one pipe 108 to receive gas from the at least one pipe 108.

The fluid in the fluid chamber 716 can apply a force on the clapper 708 in a direction towards the gas chamber 724, and the gas chamber 724 can apply a force on the clapper 708 in a direction towards the fluid chamber 716. As depicted in FIG. 7, the clapper 708 can be held in a first position that prevents fluid from flowing from the fluid chamber 716 through the gas chamber 724 based on these forces. The clapper 708 may be biased to the first position (e.g., using a spring). When pressure in the gas chamber 724 decreases (e.g., due to the at least one sprinkler 104 opening) below a threshold (e.g., a threshold corresponding to the force applied by the fluid acting on the clapper 708), the clapper 708 can be moved away from the fluid chamber 716, such as to rotate in the direction 710, allowing fluid to flow from the fluid supply 128 through the flow control valve 704 and into the at least one pipe 108.

The flow control valve 704 can include an alarm port 728 coupled with the vent 144 of the accelerator 140 and with the gas chamber 724. When the accelerator 140 is triggered by decrease of pressure in the at least one pipe 108, gas can flow from the gas chamber 724 through the vent 144 and out of the accelerator 140, accelerating opening of the flow control valve 704.

Figure 8:
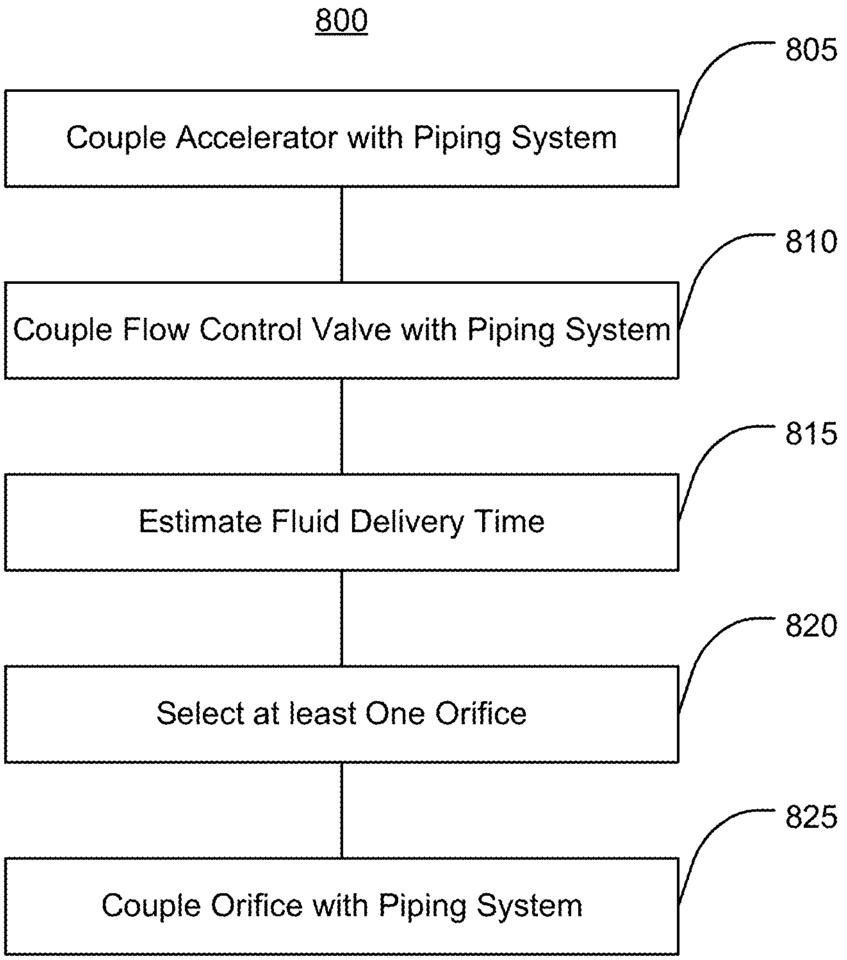
FIG. 8 is a flow diagram of a method of configuring a piping system.

FIG. 8 depicts a method 800 of operating a dry pipe accelerator system. The method 800 can be implemented using various devices and systems described herein, such as the dry pipe accelerator system 100 and the dry pipe accelerator system 700.

At 805, an accelerator can be coupled with a piping system. The piping system can include at least one pipe coupled with at least one sprinkler. The at least one sprinkler can change from a closed state to an open state in response to a fire condition, such as when a thermal element (e.g., glass bulb) of the at least one sprinkler breaks due to heat from the fire condition. The accelerator can include a plurality of openings that couple with the piping system. For example, the accelerator can include a first accelerator opening coupled with a first connection point of the piping system and a second accelerator opening coupled with a second connection point of the piping system. The accelerator can include a vent.

A pilot actuator may be coupled with the piping system. For example, the pilot actuator can include a first actuator port coupled with the piping system by a segment of the piping system that begins upstream of the accelerator, and a second actuator port coupled with an actuator line. A reset actuator may be coupled with the pilot actuator. For example, the reset actuator can include a third actuator port coupled with the actuator line. The reset actuator can include a fourth actuator port coupled with a first fluid supply, and a fifth actuator port coupled with a control line.

At 810, a flow control valve is coupled with the piping system. The flow control valve may include a valve inlet coupled with a second fluid supply, and a valve outlet coupled with the at least one pipe. The flow control valve may include a diaphragm supply port coupled with the control line coupled with the reset actuator, and a diaphragm in a diaphragm chamber coupled with the diaphragm supply port that moves from a first state prevent flow from the valve inlet to the valve outlet when pressure in the diaphragm chamber decreases below a first pressure threshold. The flow control valve may include an alarm port coupled with the vent of the accelerator and a gas chamber coupled with the valve outlet, and a clapper that can move from a first clapper position that prevents fluid from flowing from the valve inlet to the valve outlet to a second clapper position in which the valve inlet and valve outlet are in fluid communication when pressure in the gas chamber decreases below a second pressure threshold.

At 815, a fluid delivery time is estimated. The fluid delivery time may correspond to a time from when the at least one sprinkler opens to when fluid is outputted from the at least one sprinkler. The fluid delivery time may be estimated using a software model of the piping system, such as the TYCO SPRINKCAD software. For example, the fluid delivery time can be estimated by modeling the sprinkler system as pipes connected by nodes (e.g., transitions from one pipe size to another, elbows, bends, tees and laterals for dividing or mixing streams, valves, and discharge points such as an inspector's test connection, open sprinkler), and based on conditions such as types of water supply (e.g., constant pressure, variable pressure, pump ramp-up), as well as flow properties of the gas or fluid.

A valve trip time may be estimated. The valve trip time can be a time from when the at least one sprinkler opens to when the flow control valve is operated to connect the valve inlet to the valve outlet.

At 820, at least one orifice is selected. The at least one orifice can be selected based on at least one of the fluid delivery time and the valve trip time. For example, the at least one orifice can be selected to have a size that maintains the fluid delivery time below a maximum threshold fluid delivery time, such as 60 seconds.

The at least one orifice may include a first orifice, which can be selected to be coupled with the piping system between the at least one sprinkler and the accelerator. The first orifice may be used with various flow control valves, including the flow control valve that includes the diaphragm or the flow control valve that includes the clapper.

The at least one orifice may include a second orifice, such as for use with the flow control valve that includes the diaphragm. The second orifice can have a size greater than that of the first orifice, such as an inner diameter greater than an inner diameter of the first orifice. The second orifice can be selected to for coupling with the piping system upstream of the first orifice, such as to cooperate with the first orifice to enable effective operation of the accelerator within the target performance conditions.

At 825, the at least one orifice is coupled with the piping system. The first orifice can be coupled with the piping system between the at least one sprinkler and the accelerator. The second orifice can be coupled with the piping system upstream of the first orifice where the piping system uses a flow control valve that includes a diaphragm.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A sprinkler accelerator system, comprising:

an accelerator comprising:

at least one accelerator opening coupled with at least one pipe, the at least one pipe coupled with at least one sprinkler, a gas including at least one of air and nitrogen in the at least one pipe;

a vent; and an actuator assembly that moves, responsive to a rate of change of a first pressure applied by gas in the at least one accelerator opening satisfying a pressure rate threshold, to couple the at least one accelerator opening with the vent; and at least one orifice coupled with the at least one pipe to adjust the rate of change of the first pressure responsive to the at least one sprinkler changing to an open state.

2. The sprinkler accelerator system of claim 1, comprising:

a flow control valve comprising:

a valve inlet coupled with a fluid supply;

a valve outlet coupled with the at least one pipe;

a diaphragm chamber between the valve inlet and the valve outlet; and a diaphragm that moves in the diaphragm chamber to connect the valve inlet with the valve outlet, the diaphragm moves responsive to a second pressure in the diaphragm chamber decreasing below a second threshold; and the at least one orifice includes a first orifice between a first accelerator opening of the accelerator and a second accelerator opening of the accelerator, the first accelerator opening between the second accelerator opening and the at least one sprinkler, and a second orifice between the first accelerator opening and the at least one sprinkler.

3. The sprinkler accelerator system of claim 1, comprising:

a flow control valve comprising:

a valve inlet coupled with a fluid supply;

a valve outlet coupled with a connection point of the at least one pipe between the at least one sprinkler and the accelerator; and a valve port coupled with the vent of the accelerator; and the at least one orifice includes a first orifice between a first accelerator opening of the accelerator and a second accelerator opening of the accelerator.

4. The sprinkler accelerator system of claim 1, comprising:

a pilot actuator comprising a first actuator port coupled with the at least one pipe, a second actuator port coupled with a flow control valve, and a drain, the pilot actuator couples the second actuator port with the drain responsive to a second pressure applied by gas in the first actuator port decreasing below a second pressure threshold to control operation of the flow control valve.

5. The sprinkler accelerator system of claim 1, comprising:

a pilot actuator comprising a first actuator port coupled with the at least one pipe, a second actuator port coupled with a flow control valve, and a drain, the pilot actuator couples the second actuator port with the drain responsive to a second pressure applied by gas in the first actuator port decreasing below a second pressure threshold to control operation of the flow control valve; and a reset actuator comprising:

a third actuator port coupled with a first fluid supply;

a fourth actuator port coupled with the flow control valve, the fourth actuator port in fluid communication with the third actuator port;

a fifth actuator port coupled with the pilot actuator; and a seal that moves to connect the third actuator port and the fourth actuator port with the pilot actuator, the seal moves responsive to a third pressure in the fifth actuator port decreasing below a third threshold.

6. The sprinkler accelerator system of claim 1, comprising:

the gas in the at least one pipe is pressurized to at least 15 pounds per square inch (psi).

7. The sprinkler accelerator system of claim 1, comprising:

the accelerator includes an accelerator chamber between the at least one orifice and the actuator assembly, the accelerator chamber has a greater diameter than an opening of the accelerator through which fluid flows from the at least one orifice into the accelerator chamber.

8. The sprinkler accelerator system of claim 1, comprising:

the at least one orifice causes a rate of pressure decay in the accelerator to decrease.

9. The sprinkler accelerator system of claim 1, comprising:

a spring that biases the actuator assembly of the accelerator towards a state in which the at least one pipe is not connected with the vent.

10. The sprinkler accelerator system of claim 1, comprising:

the at least one orifice is sized based on a fluid delivery time of fluid from a fluid supply through a flow control valve to the at least one sprinkler, the fluid delivery time measured from an instant at which the at least one sprinkler opens.

11. The sprinkler accelerator system of claim 1, comprising:

a flow control valve coupled with the accelerator.

12. The sprinkler accelerator system of claim 1, comprising:

the at least one sprinkler, the at least one sprinkler to change to the open state responsive to a fire.

13. The sprinkler accelerator system of claim 1, comprising:

the at least one orifice comprises a plurality of orifices.

14. The sprinkler accelerator system of claim 1, comprising:

the gas in the at least one pipe is pressurized to less than or equal to 60 psi.

15. The sprinkler accelerator system of claim 1, comprising:

the at least one orifice is sized to maintain a fluid delivery time, for delivery of fluid from a fluid supply coupled with the accelerator to the at least one sprinkler, to 60 seconds or less.

* * * * *